(12) United States Patent
Lee et al.

(10) Patent No.: US 7,932,984 B2
(45) Date of Patent: Apr. 26, 2011

(54) END-SEALANT COMPOSITION, LIQUID CRYSTAL DISPLAY PANEL, AND METHOD OF MANUFACTURING LIQUID CRYSTAL DISPLAY PANEL

(75) Inventors: Seong-Nam Lee, Seoul (KR); Jeong-Uk Heo, Seongnam-si (KR); Nam-Seok Lee, Suwon-si (KR); Jun-Hyup Lee, Seoul (KR); Jung-Hun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 385 days.

(21) Appl. No.: 12/241,676

(22) Filed: Sep. 30, 2008

(65) Prior Publication Data

US 2009/0147206 A1   Jun. 11, 2009

(30) Foreign Application Priority Data

Oct. 16, 2007   (KR) .................. 10-2007-0104019

(51) Int. Cl.
*G02F 1/1339* (2006.01)

(52) U.S. Cl. .................. 349/154; 349/153; 349/190

(58) Field of Classification Search ............... 349/154, 349/153, 190
See application file for complete search history.

(56) References Cited

U.S. PATENT DOCUMENTS

| | | | | |
|---|---|---|---|---|
| 4,587,276 A * | 5/1986 | Lien et al. | ......... | 522/34 |
| 6,674,507 B2 * | 1/2004 | Yoshizoe | ......... | 349/190 |
| 7,186,780 B2 * | 3/2007 | Hasegawa et al. | ......... | 525/326.6 |
| 7,280,179 B2 * | 10/2007 | Hsu et al. | ......... | 349/153 |
| 7,626,678 B2 * | 12/2009 | Yang et al. | ......... | 349/192 |
| 2009/0192265 A1 * | 7/2009 | Hasegawa et al. | ......... | 525/101 |

* cited by examiner

*Primary Examiner* — Mike Qi
(74) *Attorney, Agent, or Firm* — Cantor Colburn LLP

(57) ABSTRACT

An end-sealant composition for a liquid crystal display (LCD) panel includes an acrylic polymer resin, a polymeric photoinitiator polymerized into an acrylic chain, and an acrylphilic coupling agent. The end-sealant composition exhibits reduced diffusion into the liquid crystals during an end-sealant forming process. Image defects such as stains around fill ports and incidental images are thereby prevented, so that high quality displays can be prepared. Use of the end-sealant composition can provide high performance for high dielectric constant liquid crystals that are widely used in the fabrication of liquid crystal display panels.

14 Claims, 4 Drawing Sheets

END-SEALANT COMPOSITION, LIQUID CRYSTAL DISPLAY PANEL, AND METHOD OF MANUFACTURING LIQUID CRYSTAL DISPLAY PANEL

This application claims priority to Korean Patent Application No. 10-2007-0104019 filed on Oct. 16, 2007, and all the benefits accruing therefrom under 35 U.S.C. §119(a), the contents of which are incorporated herein by reference in their entirety.

BACKGROUND OF THE INVENTION

1. Field of the Invention

The present disclosure relates to an end-sealant composition, a liquid crystal display panel having the end-sealant composition and a panel, and a method for manufacturing the liquid crystal display panel. More specifically, the present disclosure relates to an end-sealant composition for sealing a fill port after filling a liquid crystal display with liquid crystals, a liquid crystal display panel having the end-sealant composition and a method of manufacturing the liquid crystal display panel.

2. Description of the Related Art

Recently, the demand for high-performance display devices has increased. Such high-performance display devices can be used to display various kinds of information, such as images, graphics, and text. According to such demand, display industries have shown rapid growth in recent years.

In particular, liquid crystal display ("LCD") devices have been continuously developed for years and have increased greatly in popularity as a next generation display device because the LCD device has low power consumption, lightweight and thin thickness, and does not release harmful electromagnetic radiation compared to a cathode ray tube ("CRT") display device. The LCD devices have drawn attention for use as large sized display device along with plasma display panels ("PDPs"), which have screen sizes of more than 30 inches, useful for digital broadcasting.

The LCD device itself includes two substrates, with liquid crystals having an intermediate state between solid state and liquid state, and electrodes formed in an enclosed space between the two substrates. An image is displayed in the LCD device by rotating the liquid crystals by application of an electric field generated between the two electrodes. LCD devices are widely used in different electronic devices, such as electronic watches, electronic calculators, personal computers and television sets.

An LCD panel is typically manufactured by bonding a first substrate including a pixel electrode, a thin film transistor, and other components, to a second substrate including a common electrode using a sealant; filling the space between the first and second substrates with the liquid crystals via a fill port; and sealing the fill port using an end-sealant.

The end-sealant used in this operation is typically formed by curing an end-sealant composition which includes a photoinitiator. However, the liquid crystals are polluted by an elution of the uncured end-sealant composition. Thereby, inferior image of the LCD device, such as a stain and an incidental image is displayed. The elution of the end-sealant composition easily is generated in the liquid crystals of a high dielectric constant, which are driven by a low voltage.

BRIEF SUMMARY OF THE INVENTION

In an embodiment, an end-sealant composition for a liquid crystal panel is provided, the end-sealant composition including an acrylic polymer resin, a polymeric photoinitiator polymerized into an acrylic chain (i.e., an oligomer or polymer of acrylic repeating units) and an acryl-philic coupling agent (i.e., a coupling agent having an affinity for acrylic polymers).

The acrylic polymer resin can include at least one selected from the group consisting of a bisphenol A-based acrylic resin, a bisphenol F-based acrylic resin, a bisphenol S-based acrylic resin, a bisphenol B-based acrylic resin, and a mixture thereof.

Weight averaged molecular weight ("Mw") of the acrylic polymer resin may be from about 5,000 g/mol to about 30,000 g/mol.

The polymeric photoinitiator can include at least one selected from the group consisting of benzophenone-based photoinitiator, acetophenone-based photoinitiator, triazine-based photoinitiator, and a mixture thereof.

Weight averaged molecular weight (Mw) of the polymeric photoinitiator can be from about 5,000 g/mol to about 30,000 g/mol.

The acryl-philic coupling agent can include a silane-based compound.

The silane-based compound can include an acrylic chain as a functional group.

Weight averaged molecular weight (Mw) of the acrylic chain as the functional group can be from about 5,000 g/mol to about 30,000 g/mol.

A viscosity of the end-sealant composition can be from about 10,000 centipoise ("cP") to about 50,000 cP.

In an embodiment, a liquid crystal panel is provided which includes a lower substrate having a pixel electrode on a surface thereof, an upper substrate having a common electrode on a surface thereof, a sealing pattern for adhering the lower substrate and the upper substrate such that the pixel electrode and the common electrode face one another, a fill port formed by the sealing pattern, liquid crystals filling a space between the lower substrate and the upper substrate and bounded by the sealing pattern, and an end-sealant to seal the fill port. The end-sealant includes acrylic polymer resin, a polymeric photoinitiator polymerized by an acrylic chain and an acryl-philic coupling agent.

The acrylic polymer resin can include at least one selected from the group consisting of a bisphenol A-based acrylic resin, a bisphenol F-based acrylic resin, a bisphenol S-based acrylic resin, a bisphenol B-based acrylic resin, and a mixture thereof.

The polymeric photoinitiator can include at least one selected from the group consisting of a benzophenone-based photoinitiator, an acetophenone-based photoinitiator, a triazine-based photoinitiator, and a mixture thereof.

The acryl-philic coupling agent can include a silane-based compound.

The silane-based compound can include an acrylic chain as a functional group.

A dielectric constant of the liquid crystals can be 12 when determined at a temperature of greater than about 20° C.

In an embodiment, a manufacturing method for forming a liquid crystal display device is provided. In the method, a lower substrate having a pixel electrode can be prepared, an upper substrate having a common electrode can be prepared, and a sealing pattern can be formed on either the lower substrate or upper substrate such that a fill port is formed at an edge of the lower substrate or the upper substrate. The lower substrate can be adhered to the upper substrate by contacting the substrate (upper or lower) without the sealing pattern thereon to the sealing pattern such that the pixel electrode on the surface of the lower substrate faces the common electrode on the surface of the upper substrate, the sealing pattern is cured, a space between the lower substrate and the upper substrate and bounded by the sealing pattern can be filled with the liquid crystals via the fill port, the fill port can be sealed by an end-sealant composition, and the end-sealant composition can be cured. The end-sealant composition includes an acrylic polymer resin, a polymeric photoinitiator polymerized into an acrylic chain and an acryl-philic coupling agent.

The acrylic polymer resin can include at least one selected from the group consisting of a bisphenol A-based acrylic resin, a bisphenol F-based acrylic resin, a bisphenol S-based acrylic resin, a bisphenol B-based acrylic resin, and a mixture thereof.

The polymeric photoinitiator can include at least one selected from the group consisting of a benzophenone-based photoinitiator, an acetophenone-based photoinitiator, a triazine-based photoinitiator, and a mixture thereof.

The acryl-philic coupling agent can include a silane-based compound.

A viscosity of the end-sealant composition may be from about 10,000 cP to about 50,000 cP.

BRIEF DESCRIPTION OF THE DRAWINGS

The above and other aspects, features and advantages of the present disclosure will become more apparent by describing exemplary embodiments thereof with reference to the accompanying drawings, in which.

DETAILED DESCRIPTION OF THE INVENTION

Figure 1A:
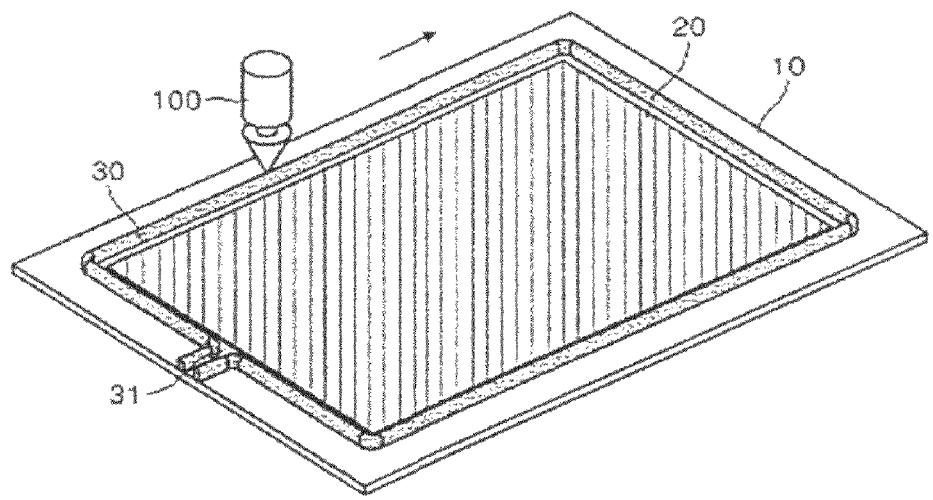
FIGS. 1A, 1B, 1C and 1D are views illustrating an exemplary method of manufacturing a liquid crystal display panel according to an embodiment.

The present invention is described more fully hereinafter with reference to the accompanying drawings, in which exemplary embodiments are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, and the like, may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the preferred embodiments will be explained in detail with reference to the accompanying drawings.

FIGS. 1A, 1B, 1C and 1D are views illustrating a method of manufacturing a liquid crystal display device in accordance with an exemplary embodiment. For convenience of description, in FIGS. 1C and 1D, a sealing pattern 30, an alignment layer 20, and liquid crystals 40 are illustrated as they would be seen through an upper substrate 50.

Figure 1B:
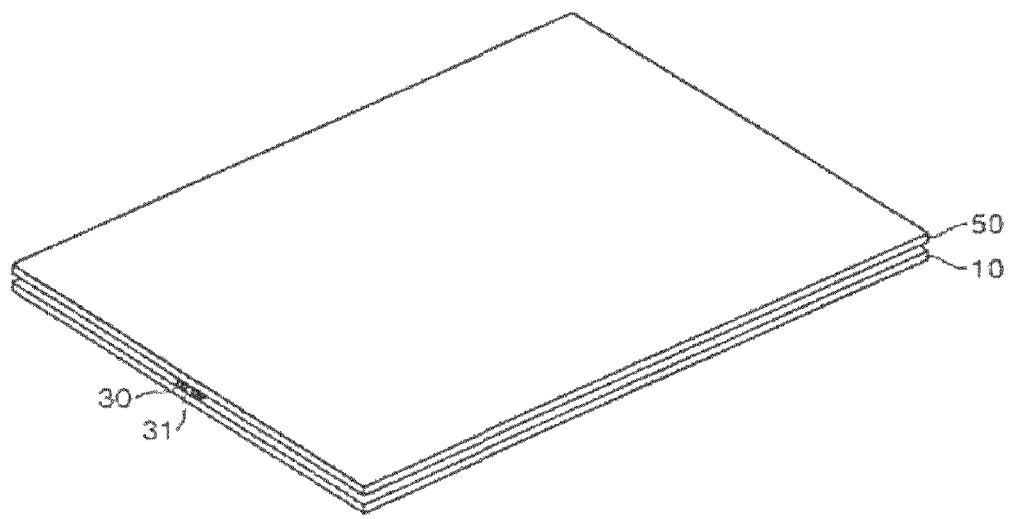
Figure 1C:
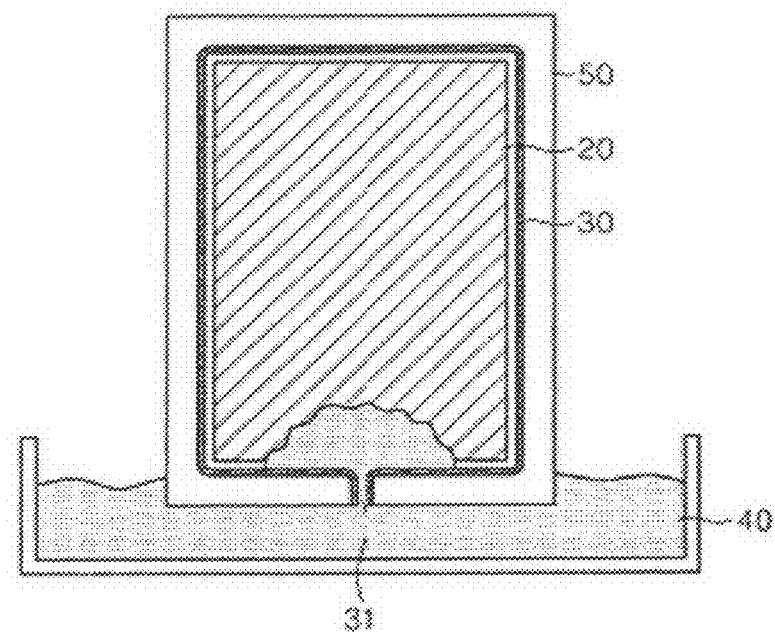

In an exemplary method, first, the upper substrate 50 and a lower substrate 10 are prepared (see e.g., FIG. 1C).

In an embodiment, a manufacturing method for the upper substrate 50 may include forming a common electrode (not shown) on an upper insulation substrate and forming the alignment layer 20 over the common electrode. In FIG. 1A, a manufacturing method for the lower substrate 10 can include forming a gate line (not shown), a gate insulation layer (not shown), a data line (not shown), a thin film transistor (not shown) and a pixel electrode (not shown) sequentially on a surface of a lower insulation substrate (not shown) to form the lower substrate 10, and forming the alignment layer 20 on a surface of lower substrate 10 over the gate line, the gate insulation layer, the data line, the thin film transistor and the pixel electrode.

The sealing pattern 30 is formed at or near an edge of the lower substrate 10 (or similarly, the upper substrate 50, not shown), and is formed discontinuously to provide a fill port 31 as shown in FIG. 1A. The sealing pattern 30 can be formed adjacent to alignment layer 20 on the surface of lower substrate 10 (or upper substrate 50, not shown in FIG. 1A). The sealing pattern 30 is cured after adhering the lower substrate 10 to the upper substrate 50 such that the sealing pattern 30 is disposed between opposing surfaces of lower substrate 10 and upper substrate 50, as shown in FIG. 1B.

The sealing pattern 30 is formed at an edge of the lower substrate 10 (or the upper substrate 50, not shown) to contain the liquid crystals 40 in a space between the lower substrate 10 and the upper substrate 50, and bounded by cured sealing pattern 30. The sealing pattern 30 may be formed at peripheral areas of the alignment layer 20 as shown in FIG. 1A, since the adhesive strength of the sealing pattern toward the alignment layer 20 is weak. When the sealing pattern 30 is formed, the fill port 31 is formed so that the resulting space between the lower substrate 10 and the upper substrate 50 can be filled with the liquid crystals 40, after the lower substrate 10 is adhered to the upper substrate 50.

The sealing pattern 30 may be formed by use of a dispenser 100 as shown in FIG. 1A. Moreover, the sealing pattern 30 can be formed by a screen printing method.

The liquid crystals 40 fill the space located between surfaces of the lower substrate 10 and the upper substrate 50 via the fill port 31 as shown in FIG. 1C.

The liquid crystals 40 can fill the space between the lower substrate 10 and the upper substrate 50 by using a suitable method, such as, in an embodiment, vacuum infiltration. For example, the liquid crystals 40 can fill a vacuum created in the space between the lower substrate 10 and the upper substrate 50 by dipping the fill port 31 in a container filled with the liquid crystals 40 as shown in FIG. 1C.

Figure 1D:
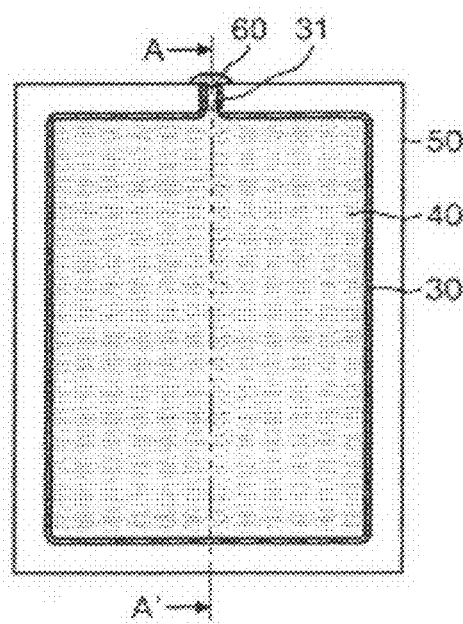

After filling the space with liquid crystals 40, the fill port 31 is sealed by an end-sealant 60 formed by curing an end-sealant composition as shown in FIG. 1D.

The end-sealant composition comprises an acrylic polymer resin, a polymeric photoinitiator and an acryl-philic coupling agent. Conventional end-sealant compositions can diffuse into the liquid crystals (and vice versa) prior to curing the conventional end-sealant composition, and can thereby cause failure of the end seal, manifesting in such defects as a stain visible around the fill port and as an incidental image. However, the end-sealant composition disclosed herein, and in accordance with the exemplary embodiments, has a greater resistance to diffusion into the liquid crystals 40 prior to curing when compared with the conventional end-sealant composition, which thereby reduces distorted images that would occur as a result of defects arising from diffusion of the end sealant composition, such as with a stain around the fill port or an incidental image. The end-sealant composition can be effectively used with liquid crystals 40 having a high dielectric constant of greater than about 12 because diffusion of the end-sealant composition occurs more frequently with liquid crystals having a higher dielectric constant (i.e., greater than about 12).

The acrylic polymer resin may include a bisphenol A-based acrylic resin, a bisphenol F-based acrylic resin, a bisphenol S-based acrylic resin, a bisphenol B-based acrylic resin, and the like. These can be used alone or in a mixture thereof. Weight averaged molecular weight of the acrylic polymer resin may be from about 5,000 g/mol to about 30,000 g/mol and the molecular weight of the acrylic polymer resin may be from about 5,000 g/mol to about 20,000 g/mol. When the weight averaged molecular weight of the acrylic polymer resin is less than about 5,000 g/mol, the stain may be caused because the elution of the end-sealant composition is increased. When the weight averaged molecular weight of the acrylic polymer resin is greater than about 30,000 g/mol, manufacturing errors can result from the higher viscosity.

The polymeric photoinitiator polymerized by an acrylic chain can include benzophenone-based photoinitiator, acetophenone-based photoinitiator, triazine-based photoinitiator, and the like. These can be used alone or in a mixture thereof. The polymeric photoinitiator is not limited theses. Weight averaged molecular weight of the polymeric photoinitiator can be from about 5,000 g/mol to about 30,000 g/mol and the weight averaged molecular weight of the polymeric photoinitiator can be from about 5,000 g/mol to about 10,000 g/mol. When the weight averaged molecular weight of the polymeric photoinitiator is less than about 5,000 g/mol, stains may result because the diffusion of the end-sealant composition increases. When the weight averaged molecular weight of the polymeric photoinitiator is greater than about 30,000 g/mol, contamination of the liquid crystals 40 can result from diffusion of the uncured acrylic resin, which can diffuse because reactivity of the polymeric photoinitiator (and hence crosslinking in the end-sealant composition) may be reduced.

The acryl-philic coupling agent can be a silane-based compound. The silane-based compound can include an acrylic chain as a functional group. The weight averaged molecular weight of the acrylic chain as the functional group can be from about 5,000 g/mol to about 30,000 g/mol, specifically from about 5,000 g/mol to about 10,000 g/mol. When the weight averaged molecular weight of the acrylic chain is less than about 5,000 g/mol, stains can result because diffusion of the end-sealant composition increases. When the weight averaged molecular weight of the acrylic chain is greater than about 30,000 g/mol, the reactivity of the polymeric photoinitiator (and hence crosslinking in the end-sealant) is reduced.

Viscosity of the end-sealant composition can be from about 10,000 cP to about 50,000 cP. When the viscosity of the end-sealant composition is less than 10,000 cP, stains can result because diffusion of the end-sealant composition increases. When the viscosity of the end-sealant composition is greater than 50,000 cP, manufacturing defects due to the higher viscosity can result.

Figure 2:
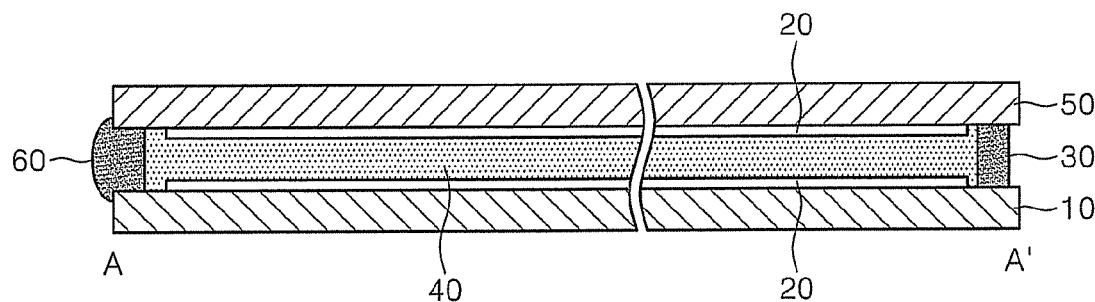
FIG. 2 is a cross-sectional view illustrating the exemplary liquid crystal display panel taken along the line A-A' of FIG. 1D.

FIG. 2 is a cross-sectional view illustrating the liquid crystal display panel taken along the line A-A' of FIG. 1D. The LCD panel includes the upper substrate 50, the lower substrate 10, alignment layers 20 formed on opposing surfaces of each of the upper substrate 50 and the lower substrate 10, the (cured) sealing pattern 30 disposed between upper substrate 50 and lower substrate 10 on the surfaces having alignment layers 20 thereon, and the liquid crystals 40 disposed between and in at least partial contact with alignment layers 20. The liquid crystals 40 fill the space formed between the lower substrate 10 and the upper substrate 50, the (cured) sealing pattern 30, and the (cured) end-sealant 60.

In an embodiment, the lower substrate 10 includes a plurality of pixels (not shown) arranged in a matrix shape on the lower insulation substrate (not shown). Each of the pixels includes a data line (not shown) to receive a data signal, a gate line (not shown) to receive a gate signal, a thin film transistor (not shown) electrically connected to the gate line and the data line and a pixel electrode (not shown) electrically connected to the thin film transistor, all formed sequentially on a surface of the lower insulation substrate and covered by alignment layer 20.

The thin film transistor (described herein but not shown) selectively supplies the data signal from the data line to the pixel electrode in response to the gate signal from the gate line. The thin film transistor includes a gate electrode electrically connected to the gate line, a source electrode electrically connected to the data line, a drain electrode electrically connected to the pixel electrode, an active layer to form a channel between the source electrode and the drain electrode while overlapping the gate electrode with a gate insulation disposed between the active layer and the gate electrode and an ohmic contact layer to make an ohmic contact of the active layer with the source and drain electrodes.

The pixel electrode is formed to overlap with color filters (not shown) in each of the pixel areas and is electrically connected to the drain electrode of the thin film transistor. An electric potential difference is generated between the pixel and common electrodes by supplying the pixel data signal supplied from the thin film transistor to the pixel electrode. The liquid crystals 40 are rotated by the electric potential difference, and the amount of light transmitted through the liquid crystals 40 is determined by the rotation angle of the liquid crystals 40.

Also in an embodiment, the upper substrate 50 includes the upper insulation substrate (not shown), a black matrix (not shown) formed on the upper insulation substrate to prevent light leakage, the color filters (not shown) formed in areas divided by the black matrix, an overcoating layer (not shown) formed over the color filters and the black matrix, and the common electrode (not shown) formed over the overcoating layer. In an embodiment, the overcoating layer can be omitted.

The black matrix blocks off the light transmitted through an area in which the liquid crystals 40 are not controlled, and prevents the light from directly irradiating the channel of the thin film transistor, so that current leakage of light from the thin film transistor is reduced. The black matrix can be formed from an opaque organic material or from an opaque metallic material.

The color filters can be red ("R"), green ("G") and/or blue ("B") color filters, and theses are formed on a surface of the upper substrate 50 under the alignment layer 20 to correspond to each of the pixels provided on the lower substrate 10. R, G, and B pigments included in the R, G, and B color filters absorb or transmit light of a particular wavelength to implement R, G, and B colors. Various colors can then be achieved by an additive mixture of the R, G, and B colors as transmitted through the R, G, and B color filters.

The overcoating layer is formed on the black matrix and the color filters to protect the color filters and to reduce a step difference between the black matrix and the color filters. The overcoating layer can be formed from a transparent organic (e.g., polymeric) material.

The common electrode is formed on the overcoating layer, and the electric field is formed in a liquid crystal layer by the difference in the pixel voltage applied to the common electrode and the pixel electrode, so that light transmittance is adjusted.

Example and Comparative Example

End-sealant compositions were manufactured according to the Example and the Comparative Example to have the composition shown in Table 1.

TABLE 1

| Composition | | Comparative Example 1 | Example 1 |
|---|---|---|---|
| Acrylic resin | A1 | 20% | — |
| | A2 | — | 70% |
| | A3 | 75% | — |
| | A4 | — | 25% |
| Photoinitiator | B1 | 0.1% | — |
| | B2 | — | 0.1% |
| Silane-based coupling agent | C1 | 2.4% | — |
| | C2 | 2.5% | — |
| | C3 | — | 2.4% |
| | C4 | — | 2.5% |

In Table 1, resins A1 and A4 are formed from bisphenol A diethoxylated diacrylate, and have weight averaged molecular weights (Mw) of about 5,000 g/mol and about 10,000 g/mol, respectively. In addition, resins A2 and A3 are each bisphenol A diglycidyl ether diacrylate oligomers copolymerized with 2-hydroxyethyl methacrylate ("HEMA"). The weight averaged molecular weights of A2 and A3 are each about 2,000 g/mol, where resin A2 comprises 25 weight percent (wt %) of 2-hydroxyethyl methacrylate based on the total weight of resin A2, and the resin A3 includes 30 wt % 2-hydroxyethyl methacrylate based on the total weight of resin A3. Photoinitiator B1 is benzophenone, and B2 is acetophenone polymerized to an acrylic chain, and the weight averaged molecular weights of photoinitiators B1 and B2 are each about 10,000 g/mol. Silane-based coupling agent C1 is KBM 5 series (available from Shin-Etsu Co., Ltd.), and C2 is KBE 5 series (available from Shin-Etsu Co., Ltd.). Silane-based coupling agents C3 and C4 are KBM 5 series having bigger molecular weight than C1 and C2 (available from Shin-Etsu Co., Ltd.), which are prepared from polymerized bisphenol-based acrylic chain. The weight averaged molecular weights of silane coupling agents C3 and C4 are 6,000 g/mol and 8,000 g/mol, respectively.

Evaluation of Diffusion into Liquid Crystals

The diffusion of the end-sealant compositions and their components into liquid crystals according to the Example and Comparative Example of Table 1 was evaluated.

Both the composition of the Example and the Comparative Example were evaluated as follows. A mixture of 1 gram of a composition (Example or Comparative Example) and 5 grams of liquid crystals LC-1 having a 12.6 dielectric constant (available from Merck Ltd.) was added to a test tube, and the test tube was wrapped with a metallic foil, such as a silver or aluminum foil. The test tube was heated to a temperature of 100° C. for about one hour to diffuse the end-sealant composition into the liquid crystals. Then, any excess end-sealant composition was separated from the mixture, and the resulting contaminated liquid crystals were removed from the test tube, extracted to remove any diffused components, and the extent of diffusion of end-sealant composition components into the liquid crystals was evaluated by gas chromatography ("GC") of the extracts from the contaminated liquid crystals. The used column type was Column DB-35MS (0.25 mm×60 m) and injector temperature was 300° C. Oven temperature changed from 80° C. to 320° C. Total flow was 30.3 ml/min and split ratio was 20.0. Interface temperature was 270° C. and injection volume was 1 µl. In the following Table 2, O and X were assigned as to whether the specified component was observed (O) or not observed (X) during GC evaluation of each composition.

TABLE 2

| Composition | | Comparative Example | Example |
|---|---|---|---|
| Acrylic resin | A1 | X | — |
| | A2 | — | O |
| | A3 | O | — |
| | A4 | — | X |
| Photoinitiator | B1 | O | — |
| | B2 | — | X |
| Silane-based coupling agent | C1 | O | — |
| | C2 | O | — |
| | C3 | — | X |
| | C4 | — | X |

Referring to Table 2, for the Comparative Example, acrylic resin A3, photoinitiator B1 and silane-based coupling agents C1 and C2 of end-sealant compositions were observed to elute by gas chromatography, indicating that these components diffused into the liquid crystals during heating. However, for the Example, only some of the acrylic resin A2 of the exemplary end-sealant composition was observed to elute by GC, indicating that the majority of the components of the end-sealant composition of the Example were desirably resistant to diffusion into the liquid crystals. Thus, the amount of diffusion of the end-sealant compositions is significantly reduced relative to the Comparative Example and similar commercial compositions.

Measurement of Luminance Change of Liquid Crystals

Contaminated liquid crystals were prepared using the compositions of the Example and the Comparative Example, and the LC-1 liquid crystals as described in the above section for evaluation of diffusion. Luminance changes of the contaminated liquid crystals, and uncontaminated liquid crystals as a control, were measured using a TOPCON RD-80S photodetector for measuring the luminance (though other suitable optical device for measuring luminance may also be used), and the measured results are shown graphically in FIG. 3.

Figure 3:
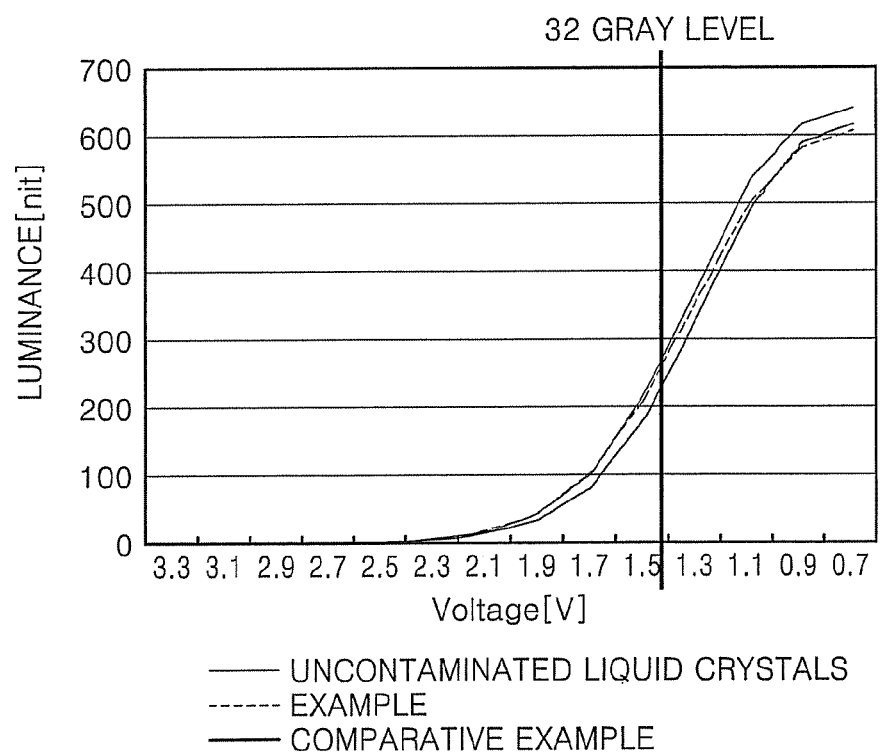
FIG. 3 is a graph illustrating an exemplary measurement result of luminance according to voltage change for Example 2.

As seen in FIG. 3, the luminance deterioration of the liquid crystals contaminated by the end-sealant composition of the Example was less than that of the liquid crystals polluted by the end-sealant composition of the Comparative Example, indicating less diffusion of contaminants into the liquid crystals by the exemplary end-sealant composition of the Example than found with the Comparative Example. In addition, the luminance of the liquid crystals contaminated by the end-sealant composition of the Example was substantially the same as that of the uncontaminated liquid crystals at a 32 gray level. The stain around the fill port 31 was evaluated at the 32 gray level.

Measurement of Luminance Change according to Contaminant

Figure 4:
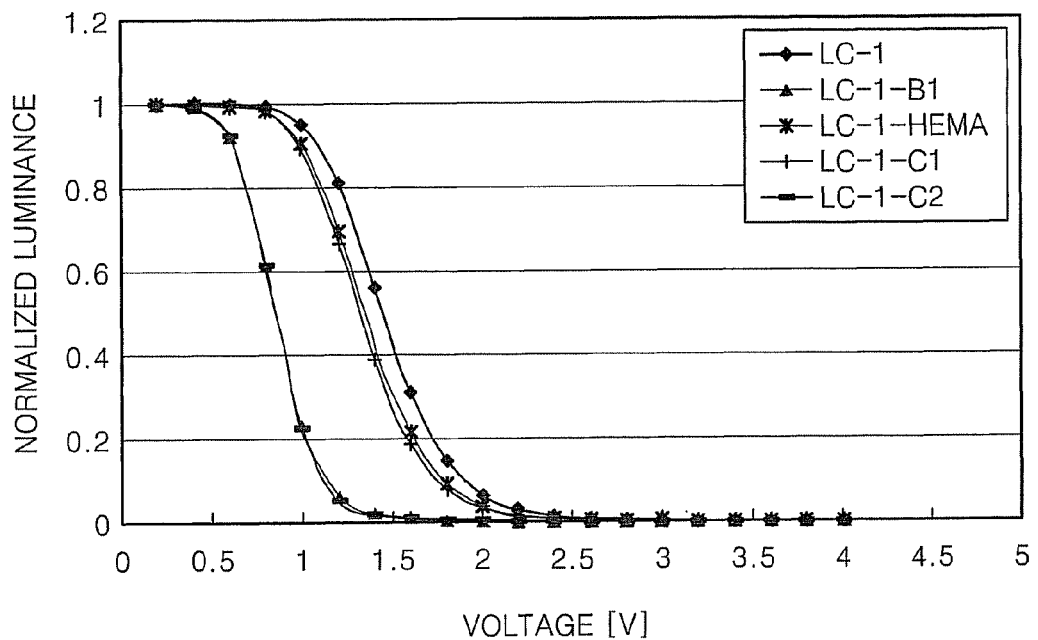
FIG. 4 is a graph illustrating an exemplary measurement result of luminance according to voltage change for liquid crystal 1 of Example 3.
Figure 5:
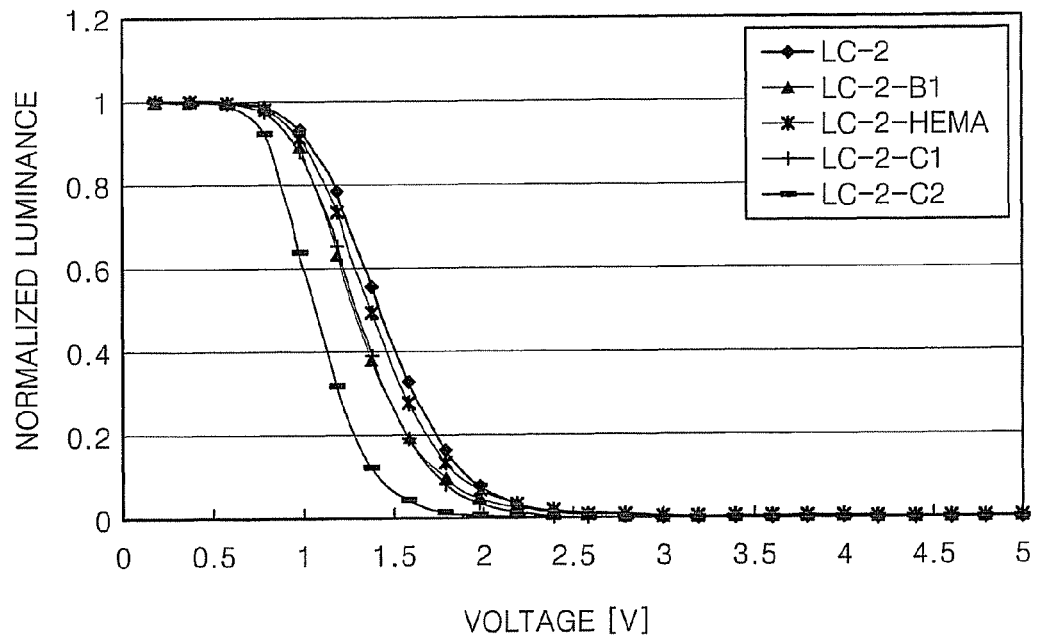
FIG. 5 is a graph illustrating an exemplary measurement result of luminance according to voltage change for liquid crystals 2 of Example 3.

Contaminated liquid crystals were prepared in a similar manner as described in the above section for evaluation of diffusion, using components of the compositions of the Example (HEMA) and the Comparative Example, (components B1, HEMA, C1, and C2) with liquid crystals LC-1 with a 12.6 dielectric constant, and with liquid crystals LC-2 with an 11.8 dielectric constant (each available from Merck Ltd.). The normalized luminance of the contaminated liquid crystals and the uncontaminated liquid crystals were measured. The measured results are shown in FIGS. 4 and 5. FIG. 4 is a graph showing luminance changes of the control and contaminated liquid crystals prepared with LC-1; FIG. 5 is a graph showing luminance changes of the control and contaminated liquid crystals prepared with LC-2.

Referring to FIGS. 4 and 5, the number of components of the compositions causing luminance deterioration was increased, and the deterioration in luminance was also found to increase correspondingly as the dielectric constant increased (from the data of FIGS. 4 to 5). In FIG. 4, LC-1, LC-1-B1, LC-1-HEMA, LC-1-C1 and LC-1-C2 respectively represent uncontaminated liquid crystals 1, liquid crystals 1 contaminated with C2, liquid crystals 1 contaminated with HEMA, liquid crystals 1 contaminated with C1, and liquid crystals 1 contaminated with C2. In FIG. 5, LC-2, LC-2-B1, LC-2-HEMA, LC-2-C1, and LC-2-C2 respectively represent liquid crystals 2, liquid crystals 2 contaminated with B1, liquid crystals 2 contaminated with HEMA, liquid crystals 2 contaminated with C1, liquid crystals 2 contaminated with C2.

In particular, it can be seen in FIG. 4 that the greatest effect on luminance is due to the presence of contamination in liquid crystal LC-1 due to components B1 and C2, both present in the Comparative Example, whereas the presence of HEMA which is found in both the Example and Comparative Example has a relatively small impact on luminance. Similarly, it can be seen in FIG. 5 that the greatest effect on luminance is due to the presence of contamination in liquid crystal LC-2 due to component C2, and to a lesser extent B1 and C1, all present in the Comparative Example, whereas the presence of HEMA which is found in both the Example and Comparative Example has a relatively small impact on luminance, Therefore, the use of the end-sealant composition of the Example has significantly less adverse impact on the luminance of liquid crystals than the components of the Comparative Example.

Evaluation of Stain Level around Fill Port

Actual liquid crystal display panels were manufactured using the end-sealant compositions of the Example and the Comparative Example, and stain levels around the respective fill ports were evaluated using the 55° C. high temperature operating limit ("HTOL") test with observation levels 0-4 (in 0.5 level increments) qualified as shown in Table 3. In Table 3, a level of 3 or 4 as evaluated is considered not to be suitable. Two sets of panels using the above compositions were manufactured, one set using liquid crystals LC-1 with a 12.6 dielectric constant, and one set using liquid crystals LC-2 with an 11.8 dielectric constant (each available from Merck Ltd.). Results of the evaluation are represented in Table 4 and are reported in terms of level of defect (i.e., stain) and number of defects found per 8 or 10 pixels examined as indicated.

TABLE 3

| Level | Stain Occurrence around Fill Port |
|---|---|
| 0 | No stain is visible at the front side and the sides (80° of top, bottom, left and right sides.) |
| 1 | No stain is visible at the front side, and a minute stain is visible at the top, bottom, left, and right sides. |
| 2 | No stain is visible at the front side, and the stain is clearly visible at the top, bottom, left, and right sides. |
| 3 | A minute stain is visible at the front side, and the stain is clearly visible at the top, bottom, left and right sides. |
| 4 | A stain is clearly visible at the front, top, bottom, left and right sides. |

TABLE 4

|  | Comparative Example | Example |
|---|---|---|
| LC-1 | 3 level per 1/10<br>2 level per 4/10<br>1 level per 5/10 | 1 level per 3/10<br>0 level per 7/10 |
| LC-2 | 1.5 level per 8/10<br>1 level per 2/10 | 1.5 level per 2/8<br>1 level per 6/8 |

As seen in Table 4, the level of the fill port for an end-sealant composition of the Example was higher than that of the Comparative Example irrespective of the kind of liquid crystals (LC-1 or LC-2) used. The margin of stain level observed at the fill port shows a greater difference between end-sealant compositions of the Example compared with the Comparative Example (with the Example showing the lower levels of defectivity) for displays prepared with the higher dielectric constant liquid crystals (LC-1).

Also as seen in Table 4, the end-sealant composition of the Example was less contaminating of the liquid crystals than the end-sealant composition of Comparative Example, and was therefore more suitable for use with the liquid crystals having a high dielectric constant than the end-sealant composition of Comparative Example.

It will be apparent to those skilled in the art that various modifications and variations can be made without departing from the spirit or scope of the invention. Thus, it is intended that the disclosure cover the modifications and variations of this invention provided they come within the scope of the appended claims and their equivalents.

What is claimed is:

1. A liquid crystal display (LCD) panel comprising:
    a lower substrate having a pixel electrode on a surface thereof;
    an upper substrate having a common electrode on a surface thereof;
    a sealing pattern to adhere the lower substrate to the upper substrate such that the pixel electrode and the common electrode face one another;
    a fill port formed by an opening in the sealing pattern;
    liquid crystals filling a space between the lower substrate and the upper substrate and bounded by the sealing pattern; and
    an end-sealant to seal the fill port,
    wherein the end-sealant comprises acrylic polymer resin, a polymeric photoinitiator polymerized by an acrylic chain and an acryl-philic coupling agent.

2. The liquid crystal display (LCD) panel of claim 1, wherein the acrylic polymer resin is at least one selected from the group consisting of a bisphenol A-based acrylic resin, a bisphenol F-based acrylic resin, a bisphenol S-based acrylic resin, a bisphenol B-based acrylic resin, and a mixture thereof.

3. The liquid crystal display (LCD) panel of claim 1, wherein the weight averaged molecular weight of the acrylic polymer resin is from about 5,000 g/mol to about 30,000 g/mol.

4. The liquid crystal display (LCD) panel of claim 1, wherein the polymeric photoinitiator is at least one selected from the group consisting of a benzophenone-based photoinitiator, an acetophenone-based photoinitiator, a triazine-based photoinitiator, and a mixture thereof.

5. The liquid crystal display (LCD) panel of claim 1, wherein the weight averaged molecular weight of the polymeric photoinitiator is from about 5,000 g/mole to about 30,000 g/mole.

6. The liquid crystal display (LCD) panel of claim 1, wherein the acryl-philic coupling agent comprises a silane-based compound.

7. The liquid crystal display (LCD) panel of claim 1, wherein the silane-based compound comprises an acrylic chain as a functional group.

8. The liquid crystal display (LCD) panel of claim 7, wherein the weight averaged molecular weight of the acrylic chain is from about 5,000 g/mole to about 30,000 g/mole.

9. The liquid crystal display (LCD) panel of claim 1, wherein a viscosity of the end-sealant composition is from about 10,000 cP to about 50,000 cP.

10. A manufacturing method for a liquid crystal display (LCD) device comprising:
    preparing a lower substrate having a pixel electrode on a surface thereof;
    preparing an upper substrate having a common electrode on a surface thereof;
    forming a sealing pattern on either the lower substrate or upper substrate such that a fill port is formed at an edge of the lower substrate or the upper substrate;
    adhering the lower substrate to the upper substrate by contacting the substrate without the sealing pattern thereon to the sealing pattern such that the pixel electrode on the surface of the lower substrate faces the common electrode on the surface of the upper substrate;
    curing the sealing pattern;
    filling a space between the lower substrate and the upper substrate and bounded by the sealing pattern with the liquid crystals via the fill port;
    sealing the fill port with an end-sealant composition; and
    curing the end-sealant composition,
    wherein the end-sealant composition comprises an acrylic polymer resin, a polymeric photoinitiator polymerized into an acrylic chain, and an acryl-philic coupling agent.

11. The method of claim 10, wherein the acrylic polymer resin is at least one selected from the group consisting of a bisphenol A-based acrylic resin, a bisphenol F-based acrylic resin, a bisphenol S-based acrylic resin, a bisphenol B-based acrylic resin, and a mixture thereof.

12. The method of claim 10, wherein the polymeric photoinitiator is any one selected from the group consisting of a benzophenone-based photoinitiator, an acetophenone-based photoinitiator, a triazine-based photoinitiator and a mixture thereof.

13. The method of claim 10, wherein the acryl-philic coupling agent comprises a silane-based compound.

14. The method of claim 10, wherein a viscosity of the end-sealant composition is from about 10,000 cP to about 50,000 cP.

* * * * *